US012803120B2

(12) United States Patent
Bheemireddy et al.

(10) Patent No.: US 12,803,120 B2
(45) Date of Patent: Nov. 17, 2026

(54) COMPOSITION WITH SMALL MOLECULE ADDITIVES FOR IMPROVED SAFETY AND PERFORMANCE IN HIGH VOLTAGE BATTERIES

(71) Applicant: Amionx, Inc., Carlsbad, CA (US)

(72) Inventors: Sambasiva Reddy Bheemireddy, Fallbrook, CA (US); Yanbo Wang, San Marcos, CA (US); Hong Yu, San Diego, CA (US); Evan Szuch, Menifee, CA (US)

(73) Assignee: Amionx, Inc., Carlsbad, CA (US)

( * ) Notice: Subject to any disclaimer, the term of this patent is extended or adjusted under 35 U.S.C. 154(b) by 754 days.

(21) Appl. No.: 18/156,290

(22) Filed: Jan. 18, 2023

(65) Prior Publication Data

US 2023/0231276 A1 Jul. 20, 2023

Related U.S. Application Data

(60) Provisional application No. 63/300,533, filed on Jan. 18, 2022.

(51) Int. Cl.
*H01M 50/486* (2021.01)
*H01M 4/04* (2006.01)
(Continued)

(52) U.S. Cl.
CPC ....... *H01M 50/486* (2021.01); *H01M 4/0404* (2013.01); *H01M 50/46* (2021.01); *H01M 50/483* (2021.01); *H01M 50/59* (2021.01)

(58) Field of Classification Search
CPC .. H01M 50/486; H01M 50/46; H01M 50/483; H01M 50/59; H01M 50/574; H01M 50/579; H01M 50/584; H01M 50/583; H01M 4/0404; H01M 4/04; H01M 4/62; H01M 4/667; H01M 4/66; H01M 4/621;
(Continued)

(56) References Cited

U.S. PATENT DOCUMENTS

2001/0041294 A1* 11/2001 Chu .................... H01M 10/052
429/231.95
2017/0244093 A1* 8/2017 Fan ....................... H01M 4/505
(Continued)

FOREIGN PATENT DOCUMENTS

EP 3224895 B1 * 4/2020 ............. H01M 4/62

*Primary Examiner* — Adam J Francis
(74) *Attorney, Agent, or Firm* — Jones Day

(57) ABSTRACT

A battery cell may include an electrolyte, a first electrode including a first electrode layer and a first current collector, a second electrode including a second electrode layer and a second current collector, a separator interposed between the first electrode and the second electrode, and at least one protective layer. For example, a protective layer may be interposed between the first electrode layer and the first current collector, the second electrode layer and the second current collector, the separator and the first electrode, and/or the separator and the second electrode. When activated, the one or more protective layers may reduce or interrupt current flow through the battery cell. The composition of the one or more protective layers may include one or more small molecule additives to increase its stability and conductivity, thus improving the performance as well as the safety profile of the battery cell.

12 Claims, 14 Drawing Sheets

(51) Int. Cl.
*H01M 50/46* (2021.01)
*H01M 50/483* (2021.01)
*H01M 50/59* (2021.01)

(58) Field of Classification Search
CPC .. H01M 4/622; H01M 4/624; H01M 10/4235; H01M 10/42; H01M 10/0525; H01M 10/052; Y02E 60/10
See application file for complete search history.

(56) References Cited

U.S. PATENT DOCUMENTS

| | | | | |
|---|---|---|---|---|
| 2019/0140328 | A1* | 5/2019 | Li | H01M 4/625 |
| 2020/0083542 | A1* | 3/2020 | Yushin | H01M 4/134 |
| 2021/0344086 | A1* | 11/2021 | Fan | H01M 10/425 |

* cited by examiner

COMPOSITION WITH SMALL MOLECULE ADDITIVES FOR IMPROVED SAFETY AND PERFORMANCE IN HIGH VOLTAGE BATTERIES

CROSS REFERENCE TO RELATED APPLICATION

This application claims priority to U.S. Provisional Application No. 63/300,533, entitled "COMPOSITION WITH SMALL MOLECULE ADDITIVES FOR IMPROVED SAFETY AND PERFORMANCE IN HIGH VOLTAGE LITHIUM-ION BATTERIES" and filed on Jan. 18, 2022, the disclosure of which is incorporated herein by reference in its entirety.

TECHNICAL FIELD

The subject matter described herein relates generally to battery cells and more specifically to a protective layer with small molecular additives for use in battery cells.

BACKGROUND

A battery cell can overcharge, overheat, and/or short circuit during operation. For example, an overcurrent can occur when the battery cell is overcharged and/or develops an internal short circuit. Overcurrent can cause irreversible damage to the battery cell. In particular, overcurrent can lead to thermal runaway, a hazardous condition in which undissipated heat from the overheating battery cell accelerates exothermic reactions within the battery cell to further increase the temperature of the battery. The consequences of thermal runaway can be especially dire including, for example, fire, explosions, and/or the like.

SUMMARY

Methods, systems, and articles of manufacture are provided for a protective layer for a battery cell. In one aspect of the current subject matter, a battery cell may include a protective layer configured to mitigate and/or eliminate the hazards that can arise during the operation of the battery cell. The protective layer may include one or more small molecule additives to facilitate cross linking and improve the stability and conductivity of the protective layer. Moreover, the protective layer may be configured to respond to an increase in temperature, voltage, and/or current by interrupting a flow of current within the battery cell. The protective layer may be disposed on one or both surfaces of at least one current collector or electrode of the battery cell. Accordingly, in some cases, a first protective layer may be interposed between a first current collector and a corresponding first electrode of the battery cell. Alternatively, and/or additionally, a second protective layer may be interposed between a second current collector and a corresponding second electrode of the battery cell.

In some cases, the protective layer may be part of a multifunctional layer that includes the protective layer and a sealing layer. The multifunctional layer may be interposed between an electrode and a current collector of the battery cell, with the sealing layer further being interposed between the electrode and the protective layer. The sealing layer may isolate the protective layer from the other components of the battery cell in particular the electrodes and the electrolyte included in the battery cell. As such, the presence of the sealing layer may lend flexibility to the choice of material used to form the protective layer. For example, the material forming the protective layer may be selected to maximize performance, with minimal consideration necessary for compatibility with the other components of the battery cell.

In another aspect, there is provided a battery cell that includes a protective layer with one or more small molecule additives. The battery cell may include: an electrolyte; a first electrode including a first electrode layer and a first current collector; a second electrode including a second electrode layer and a second current collector; a separator interposed between the first electrode and the second electrode; and a first protective layer reducing or interrupting a current flow within the battery cell upon activation, the first protective layer being formed from a composition that includes one or more small molecule additives combined with a functional material and/or a conductive material.

In some variations of the methods, systems, and articles of manufacture, one or more of the following features can optionally be included in any feasible combination.

In some variations, the one or more small molecule additives may include an aromatic amine, an aliphatic amine, an aliphatic carboxylic acid, an aromatic carboxylic acid, an aliphatic hydroxy compound, an aromatic hydroxyl compound, an aliphatic thiol compound, an aromatic thiol compound, an epoxy substituted aliphatic or aromatic compound, aromatic or aliphatic substituted pyrrole-2,5-dione, an ethylene substituted aliphatic or aromatic compound, and/or a free radical initiator.

In some variations, the composition of the first protective layer may include 0.1% to 90% of the one or more small molecule additive by weight, 1% to 50% of the one or more small molecule additive by weight, 1% to 10% of the one or more small molecule additive by weight, or 1% to 5% of the one or more small molecule additive by weight.

In some variations, the functional material may include polyacrylic acid (PAA), crosslinked polyacrylic acid (PAA), carboxymethyl cellulose (CMC), poly(methyl acrylate) (PMA), poly(methyl methacrylate) (PMMA), poly(ethyl methacrylate) (PEMA), and/or poly(2-hydroxyethyl methacrylate) (pHEMA).

In some variations, the conductive material may be carbon black or a conductive polymer selected from poly(3,4-ethylenedioxythiophene) polystyrene sulfonate (PEDOT:PSS), polypyrrole (doped), poly(n-alkylthiophene), polyalylfluorene, and poly(3,4-ethylenedioxythiophene)-co-poly(ethyleneglycol) (PEDOT-PEG) (doped).

In some variations, the composition of the first protective layer may further include one or more base materials and/or binder materials.

In some variations, the first protective layer may be interposed between (i) the first electrode layer and the first current collector or (ii) the separator and the first electrode layer.

In some variations, the first protective layer may be coupled with a sealing layer that prevents a reaction between the first protective layer and at least one of the first electrode layer and the electrolyte of the battery cell until the sealing layer is activated by a second trigger.

In some variations, the battery cell may further include a second protective layer formed from the composition that includes the one or more small molecule additives combined with the functional material and/or the conductive material. The second protective layer may be interposed between (i) the second electrode layer and the second current collector or (ii) the separator and the second electrode layer.

In some variations, the second protective layer may be coupled with a sealing layer that prevents a reaction between the second protective layer and at least one of the second electrode layer and the electrolyte of the battery cell until the sealing layer is activated by at least one of a temperature trigger, a voltage trigger, a current trigger, and a physical damage to the battery cell.

In some variations, the first protective layer may be activated by at least one of a temperature trigger, a voltage trigger, a current trigger, and a physical damage to the battery cell.

In some variations, the composition of the first protective layer may include (i) carbopol, lithium hydroxide (LiOH), super P, 4,4'-(9-fluorenylidene)dianiline, and water, (ii) carbopol, lithium hydroxide (LiOH), super P, biphenyl-4,4'-dicarboxylic acid, and water, or (iii) carbopol, lithium hydroxide (LiOH), super P, petaerytheritol tetrakis(3-mercaptoproprionate), tris[2-(acryloyloxy)ethyl] isocyanurate, and water.

In some variations, the composition of the first protective layer may include (i) 68.53% carbopol, 24.47% lithium hydroxide (LiOH), 5% super P, 2% 4,4'-(9-fluorenylidene) dianiline, and water, (ii) 67.79% carbopol, 24.21% lithium hydroxide (LiOH), 5% super P, 3% biphenyl-4,4'-dicarboxylic acid, and water, or (iii) 68.53% carbopol, 24.47% lithium hydroxide (LiOH), 5% super P, 1% petaerytheritol tetrakis(3-mercaptoproprionate), 1% tris[2-(acryloyloxy) ethyl] isocyanurate, and water.

In another aspect, there is provided a battery cell that includes: an electrolyte; a first electrode including a first electrode layer and a first current collector; a second electrode including a second electrode layer and a second current collector; a separator interposed between the first electrode and the second electrode; and a first protective layer reducing or interrupting a current flow within the battery cell upon activation, the first protective layer being formed from a composition that includes one or more metal salts, ceramic nano materials, and conductive nano additives.

In some variations of the methods, systems, and articles of manufacture, one or more of the following features can optionally be included in any feasible combination.

In some variations, the one or more metal salts may be organic salts selected from polyacid salts [—$CR_3$—$(CR_2)_{0\text{-}100}$—COOM-$]_p$, polymethacrylic salts [—$CR_2$—$(CR_2)_{0\text{-}100}$—$C(CR_3)$(COOM)-$]_p$, polyacrylate salts [—$CR_2$—$(CR_2)_{0\text{-}100}$—CR(COOM)-$]_p$, polymethylmethacrylic salts [—$CR(CR_3)$—$(CR_2)_{0\text{-}100}$—$C(CR_3)$(COOM)-$]_p$, polyols-M [—$CR_2$—$(CR_2)_{0\text{-}100}$—CR—OM-$]_p$, polysulfide-M [—$CR_2$—$(CR_2)_{0\text{-}100}$—CR—SM-$]_p$, and organic silicate [—$R_2Si$—O—$SiR_2$—$]_p$, wherein M is selected from a group of metals including lithium (Li), sodium (Na), potassium (K), calcium (Ca), cadmium (Cd), cobalt (Co), copper (Cu), iron (Fe), titanium (Ti), nickel (Ni), zinc (Zn), manganese (Mn), lead (Pb), strontium (Sr), and zinc (Zn), and wherein R is selected from H, —$CH_3$, and —$CH_2CH_3$.

In some variations, the one or more ceramic nano materials may include a metal carbonate, a metal hydrogen carbonate, a metal oxide, a metal titanate, and/or a metal silicate.

In some variations, the one or more conductive nano additives may include a carbon nano material, a carbon fiber, single wall carbon nano tubes, multi wall carbon nano tubes, a metallic powder, and/or a combination of carbon and metallic powders In some variations, the first protective layer may be interposed between (i) the first electrode layer and the first current collector or (ii) the separator and the first electrode layer.

In some variations, the first protective layer may be activated by at least one of a temperature trigger, a voltage trigger, a current trigger, and a physical damage to the battery cell.

In some variations, a second protective layer may be formed from the composition that includes the one or more small molecule additives combined with the functional material and/or the conductive material, the second protective layer being interposed between (i) the second electrode layer and the second current collector or (ii) the separator and the second electrode layer.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1A:
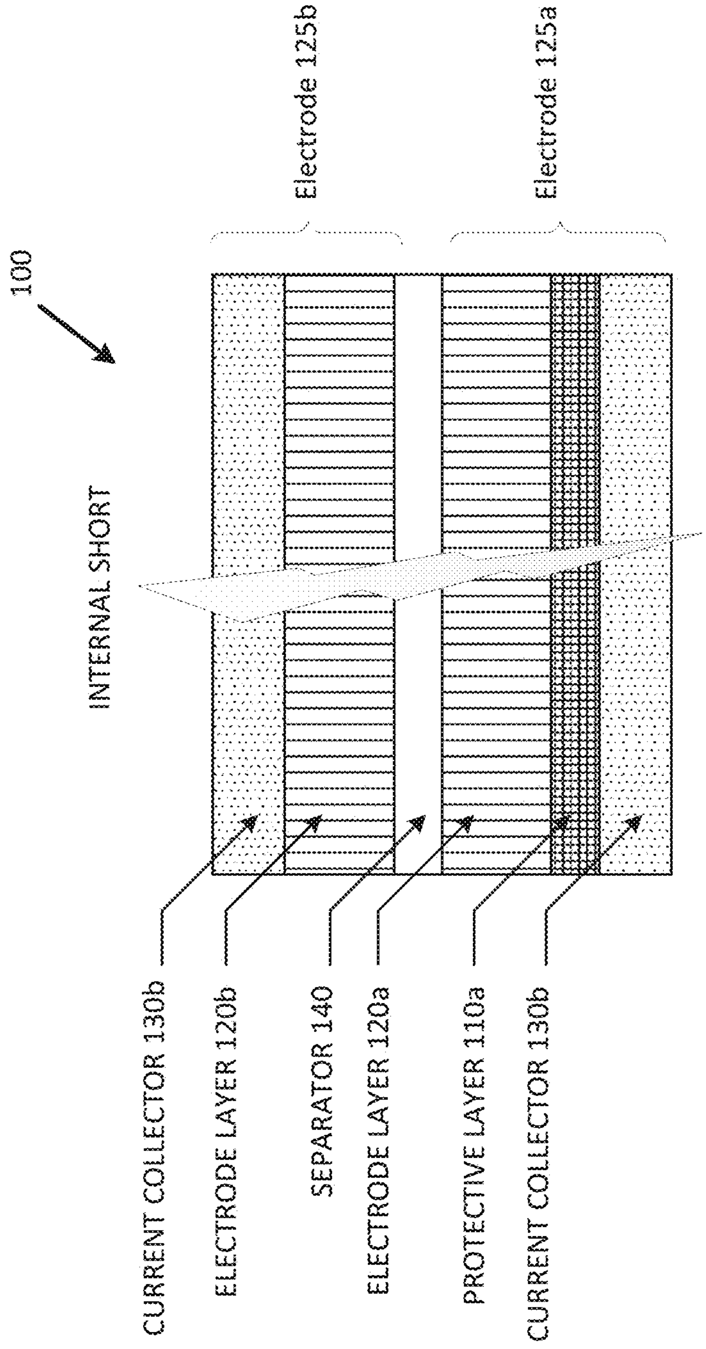
FIG. 1A depicts a schematic diagram illustrating an example of a battery cell having one or more protective layers consistent with implementations of the current subject matter.

When practical, like labels are used to refer to same or similar items in the drawings.

DETAILED DESCRIPTION

A battery cell can include at least one protective layer to mitigate and/or eliminate the operational hazards of the battery cell including, for example, overcharging, overheating, short-circuiting, and/or the like. The overcharging, overheating, and/or short-circuiting of the battery cell can lead to thermal runaway, a dangerous condition in which the battery cell undergoes a precipitous increase in temperature. Accordingly, the protective layer can be configured to respond to an increase in temperature by interrupting a flow of current within the battery cell. For example, when the battery cell is exposed to temperatures exceeding a threshold value, the protective layer can undergo a phase transition that causes the protective layer to expand and/or contract. The expansion and/or contraction of the protective layer can cause an electric decoupling within the battery cell, for example, between an electrode of the battery cell and a corresponding current collector. The electric decoupling can interrupt the flow of current within the battery cell, thereby arresting exothermic reactions within the battery cell and any further increase in the temperature of the battery cell.

In some implementations of the current subject matter, the performance of the battery cell may be further enhanced by improving the stability and conductivity of the protective layer. For example, the stability and conductivity of the protective layer may be improved by forming the protective layer from a composition that includes one or more small molecule additives. In some cases, the composition forming the protective layer may include 1-90% small molecule additives relative to one or more functional materials such as polymers (e.g., polymethyl methacrylate (PMMA) and/or the like). As used herein, the term “small molecule additive” refers to an additives having a molecular weight that is below a threshold value such as, for example, 1000 Daltons, 600 Daltons, below 500 Daltons, below 400 Daltons, and/or the like. In some cases, a small molecule additive may be a micropolymer formed by multiple identical repeating units (e.g., monomers). Examples of small molecule additives include aromatic amines, aliphatic amines, aliphatic carboxylic acids, aromatic carboxylic acids, aliphatic hydroxy compounds, aromatic hydroxyl compounds, aliphatic thiol compounds, aromatic thiol compounds, epoxy substituted aliphatic or aromatic compounds, aromatic or aliphatic substituted pyrrole-2,5-dione, ethylene substituted aliphatic or aromatic compounds, free radical initiators, and/or the like (e.g., 1,5-Naphthalenediamine, 4,4'-(9-Fluorenylidene)dianiline, 2,6-diaminoanthracene, aliphatic diol, aliphatic diamine, aliphatic dicarboxylic acid, butane-1,2,3,4,-tetracarboxylic acid, pentaerythritol, biphenyl-4,4'-dicarboxylic acid, 2,6-naphthalene dicarboxylic acid, 4-(vinyloxy)aniline, 2-allylphenol, trimethylolpropane tris(3-mercaptopropionate), petaerytheritol tetrakis(3-mercaptoproprionate), 1,3,5-triallyl-1,3,5-triazine-2,4,6(1H,3H, 5H)-trione, tris[2-(acryloyloxy)ethyl] isocyanurate, ethylene glycol bis-mercaptoacetate, 2,2'-(ethylene dioxy)diethanethiol, 4-aminothiophenol, tris(2,3-epoxypropyl) isocyanurate, 1-(4-aminophenyl)-1H-pyrrole-2,5-dione, and/or the like). It should be appreciated that small molecule additives may be used in place of large molecule additives at least because large molecule additives may be too cost prohibitive at the production scales typically associated with battery manufacturing.

To form the protective layer, the one or more small molecule additives may be combined with one or more active functional materials or inorganic materials along with one or more base materials (e.g., lithium hydroxide (LiOH), sodium hydroxide (NaOH), potassium hydroxide (KOH), and/or the like), binder materials, and/or conductive materials. Examples of functional materials include polyacrylic acid (PAA), crosslinked polyacrylic acid (PAA), carboxymethyl cellulose (CMC), poly(methyl acrylate) (PMA), poly (methyl methacrylate) (PMMA), poly(ethyl methacrylate) (PEMA), poly(2-hydroxyethyl methacrylate) (pHEMA), and/or the like. In some cases, the composition of the protective layer may include a conductive polymer. For example, in some cases, the composition of the protective layer may include 1-100% of the conductive polymer relative to the one or more conductive materials included therein or 1-100% of the conductive polymer relative to the one or more binder materials included therein. Alternatively, in some cases, the conductive polymer may be the sole conductive material and active functional material present in the composition of the protective layer. Examples of conductive polymers include poly(3,4-ethylenedioxythiophene)-poly (styrenesulfonate) (PEDOT:PSS), polypyrrole (doped), poly (n-alkylthiophene), polyalylfluorene, poly(3,4-ethylenedioxythiophene)-co-poly(ethyleneglycol) (PEDOT-PEG) (doped), and/or the like.

Exposing the protective layer to the other components of the battery cell, such as the electrodes and/or the electrolyte, may trigger undesirable reactions including degradation of the protective layer, premature activation of the protective layer, and/or the like. As such, in some implementations of the current subject matter, the protective layer may be a part of a multifunction layer that includes the protective layer and a sealing layer. The multifunction layer may be interposed between an electrode and a current collector of the battery cell, with the sealing layer further being interposed between the electrode and the protective layer. The presence of the multifunction layer including the protective layer may further improve the performance of the battery cell including the cell cycle (e.g., capacity retention) and high temperature stability of the battery cell.

In some implementations of the current subject matter, the sealing layer may be formed from one or more materials that are inert in the presence of the reactive components of the battery cell such as the electrodes and/or the electrolyte. The presence of the sealing layer may therefore lend flexibility in the choice of material forming the protective layer as the sealing layer may prevent the protective layer from being exposed to the reactive components of the battery cell. Moreover, the presence of the sealing layer may render the protective layer more tolerant to manufacturing processes (e.g., calendaring of the electrode and/or the like) as well as exposure to a high temperature environment such as during the coating and drying of the electrodes. Nevertheless, it should be appreciated that the sealing layer may be optional. For example, the multifunction layer including the protective layer and the sealing layer may be coupled with a first electrode of the battery cell whereas a second electrode of the battery cell may be coupled with the protective layer without the sealing layer.

Configuring a single protective layer to respond to multiple triggers may be challenging. Contrastingly, the sealing layer and the protective layer are configured to serve different purpose and may therefore be configured to activate upon different triggers such as, for example, a temperature trigger, a voltage trigger, a current trigger, and/or the like. For example, the sealing layer may be configured to respond to a more precise trigger point (e.g., a first threshold temperature, a first threshold voltage, a first threshold current, and/or the like) by exposing the protective layer whereas the protective layer may be configured to activate upon exposure and/or a less precise trigger point (e.g., a second threshold temperature, a second threshold voltage, a second threshold current, and/or the like).

In some implementations of the current subject matter, while the protective layer may exhibit instability towards the other components of the battery cell (e.g., electrodes, electrolyte, and/or the like), the sealing layer may be inert in the presence of these same components. For example, whereas the protective layer may become reactive in the presence of an electrolyte, the sealing layer may be immiscible and thus provide a physical separation between the protective layer, and a corresponding electrode in the battery cell. During normal operation (e.g., in the absence of any triggers), the presence of the sealing layer may prevent the protective layer from being exposed to the electrolyte and undergo an undesirable reaction. However, upon activation of a trigger associated with the sealing layer (e.g., a temperature trigger, a voltage trigger, a current trigger, and/or the like), the sealing layer may disintegrate to expose the protective layer, at which point a suitable reaction may take place to prevent thermal runaway at the battery cell. The protective layer may also be exposed by the sealing layer being broken due to application of mechanical stress.

This reaction may include a physical reaction (e.g., a swelling or other expansion of the protective layer) that causes an interruption in the electronic conduction pathway, akin to a positive temperature coefficient (PTC) composite. Alternatively and/or additionally, this reaction may include a chemical reaction such as a decomposition of the protective layer and/or a reaction between the electrode and the protective layer, which creates a nonconductive gap between the current collector and the electrode. This reaction may also include a chemical reaction between the protective layer and the electrolyte that lowers the ionic conductivity of the electrolyte.

In some implementations of the current subject matter, the sealing layer may be polymeric and applied by one or more of a solution-based spraying, coating, vapor deposition, and/or the like. Alternatively and/or additionally, the sealing layer may be metallic and applied by one or more of a metal evaporation, vapor deposition, and/or the like. Alternatively and/or additionally, the sealing layer may be formed from monomers, which are crosslinked by exposure to heat, ultraviolet light, x-ray, laser, and/or the like. Alternatively and/or additionally, the sealing layer may be formed from one or more conductive polymers and/or conductive ceramics (e.g., metal oxide, transition metal oxide, and/or the like). The sealing layer may also be formed by sputtering and/or atomic layer deposition.

In some implementations of the current subject matter, the protective layer, whether alone or as a part of a multifunction layer that further includes a sealing layer, may be coated on one or both current collectors of the battery cell. Depending on the application, such as the format of the battery cell, one or more of the current collectors may be formed from a metal foil or the case of the battery cell. Alternatively and/or additionally, the protective layer may be coated on one or both electrodes of the battery cell. The resulting battery cell may include a first protective layer interposed between a first electrode and a first current collector. Furthermore, in some cases, the battery cell may also include a second protective layer interposed between a second electrode and a second current collector.

Figure 1B:
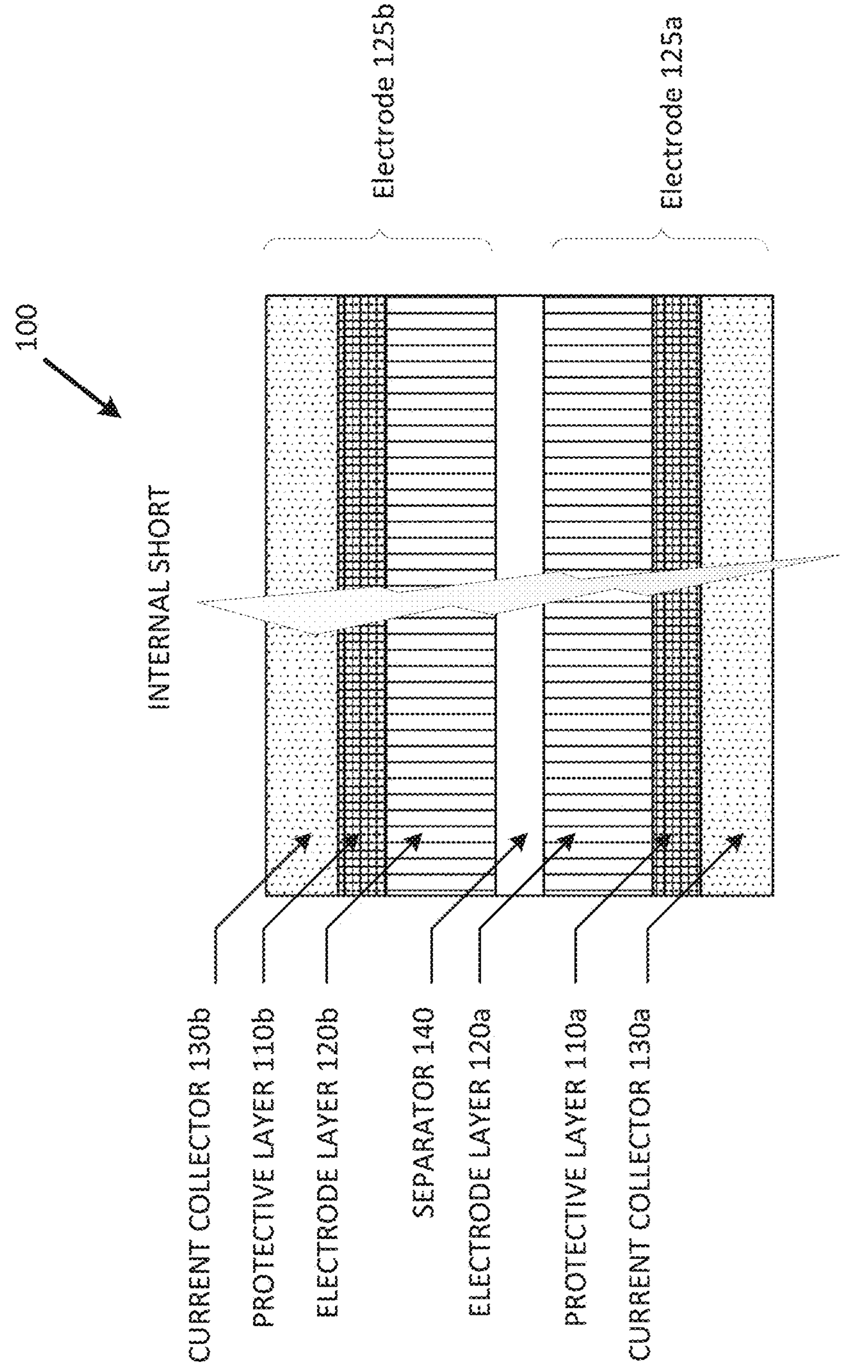
FIG. 1B depicts a schematic diagram illustrating another example of a battery cell having one or more protective layers consistent with implementations of the current subject matter.
Figure 1C:
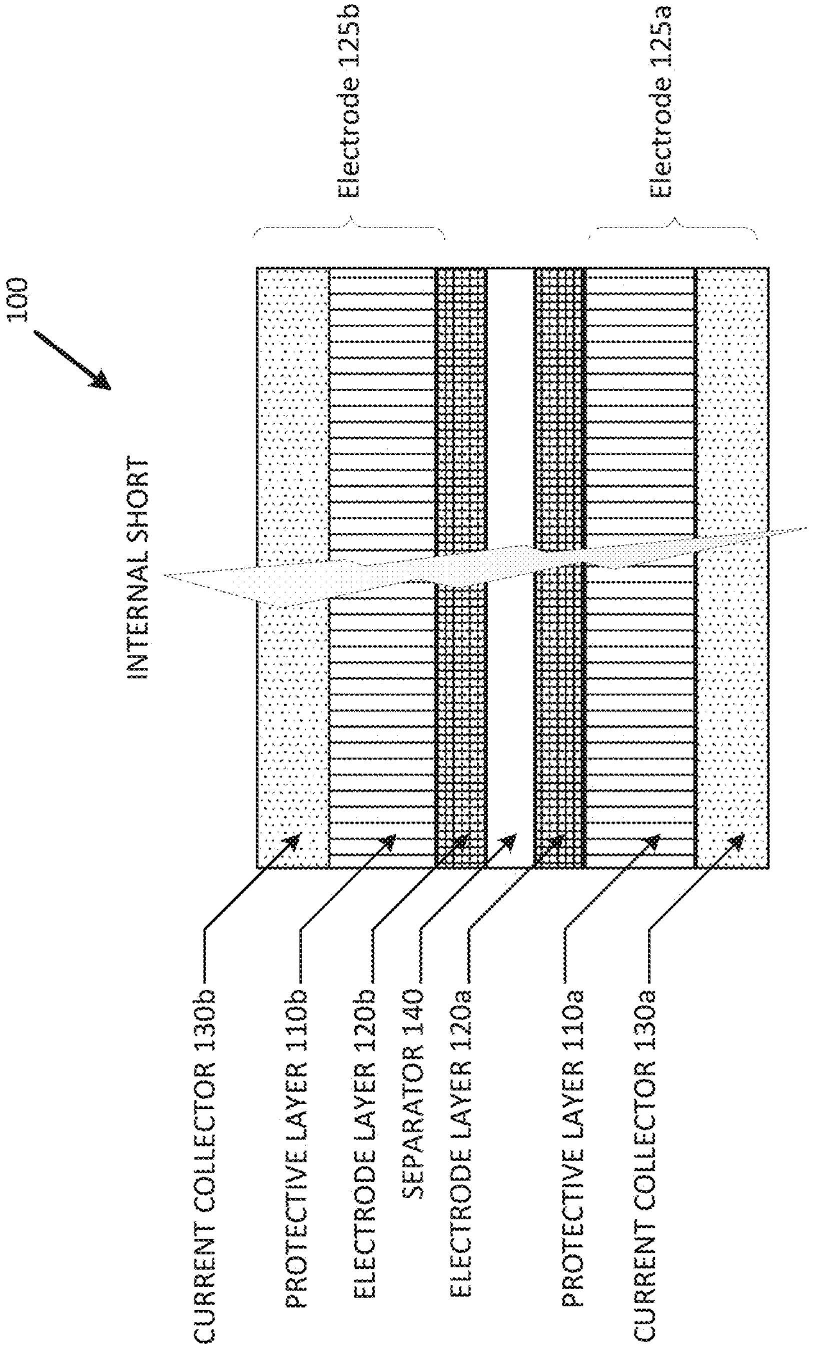
FIG. 1C depicts a schematic diagram illustrating another example of a battery cell having one or more protective layers consistent with implementations of the current subject matter.

FIGS. 1A-C depict schematic diagrams illustrating examples of a battery cell 100 having one or more protective layers 130 consistent with implementations of the current subject matter. In some cases, the battery cell 100 may be a metal battery cell or a metal ion battery cell including, for example, a lithium (Li) ion battery cell, a sodium (Na) ion battery cell, an aluminum (Al) ion battery cell, a magnesium (Mg) ion battery cell, and/or the like. Moreover, the battery cell 100 may be in any format including, for example, a cylindrical battery cell, a button battery cell, a prismatic battery cell, a pouch battery cell, and/or the like. According to various implementations of the current subject matter, at least one protective layer 130 may be disposed on a surface of a separator 140, an electrode layer 120, and/or a current collector 130 of the battery cell 100.

As shown in FIGS. 1A-C, the battery cell 100 may include a first electrode layer 120*a*, a first current collector 130*a*, a second electrode layer 120*b*, and a second current collector 130*b*. The first electrode layer 120*a* and the second electrode layer 120*b* may be opposite in polarity. For example, where the first electrode layer 120*a* and the first current collector 130*a* form a first electrode 125*a* (e.g., the positive electrode) of the battery cell 100, the second electrode layer 120*b* and the second current collector 130*b* may form a second electrode 120*b* (e.g., the negative electrode) of the battery cell 100. The separator 140, which may be a polymeric film, may be interposed between the first electrode layer 120*a* and the second electrode 130*b*. In some cases, the first current collector 130*a* and the second current collector 130*b* may be formed from a metal foil or a metallized foil including, for example, a copper (Cu) foil, an aluminum (Al) foil, an iron (Fe) foil, a titanium (Ti) foil, a nickel (Ni) foil, a carbon (C) foil, a metalized polymeric foil, and/or the like.

In the example of the battery cell 100 shown in FIG. 1A, the battery cell 100 may include a first protective layer 130*b* interposed between the first electrode layer 120*a* and the first current collector 120*b*. In the example of the battery cell 100 shown in FIG. 1B, a second protective layer 130*b* may be further interposed between the second electrode 120*b* and the second current collector 130*b*. In the example of the battery cell 100 shown in FIG. 1C, the one or more protective layers 110 are coated on one or more surfaces of the separator 140. Accordingly, in some cases, the first protective layer 110*a* may be interposed between the separator 140 and the first electrode layer 120*a*. Furthermore, in some cases, the second protective layer 110*b* may be interposed between the separator 140 and the second electrode layer 120*b*.

Figure 2A:
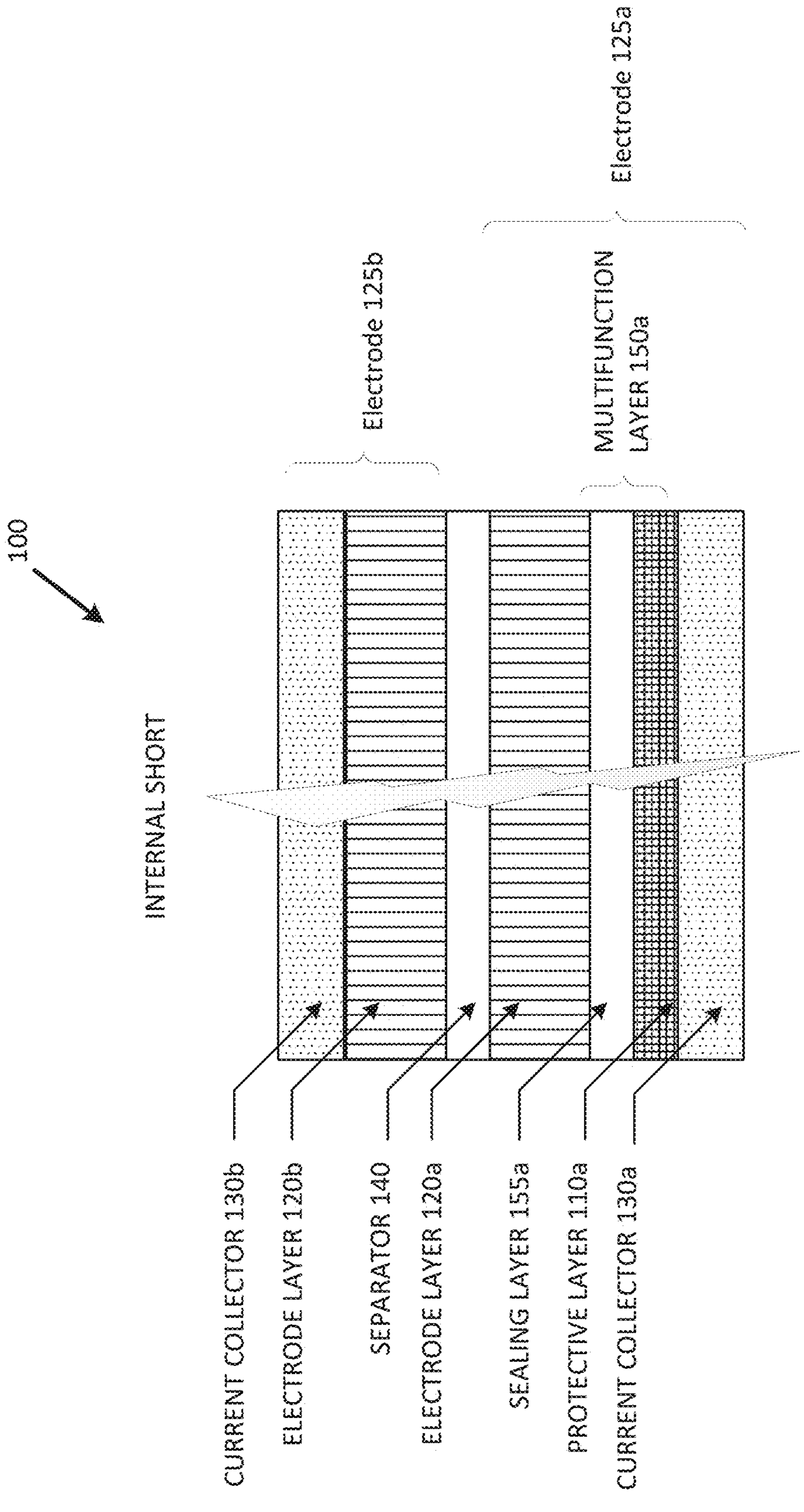
FIG. 2A depicts a schematic diagram illustrating an example of a battery cell having one or more multifunctional layers consistent with implementations of the current subject matter.
Figure 2B:
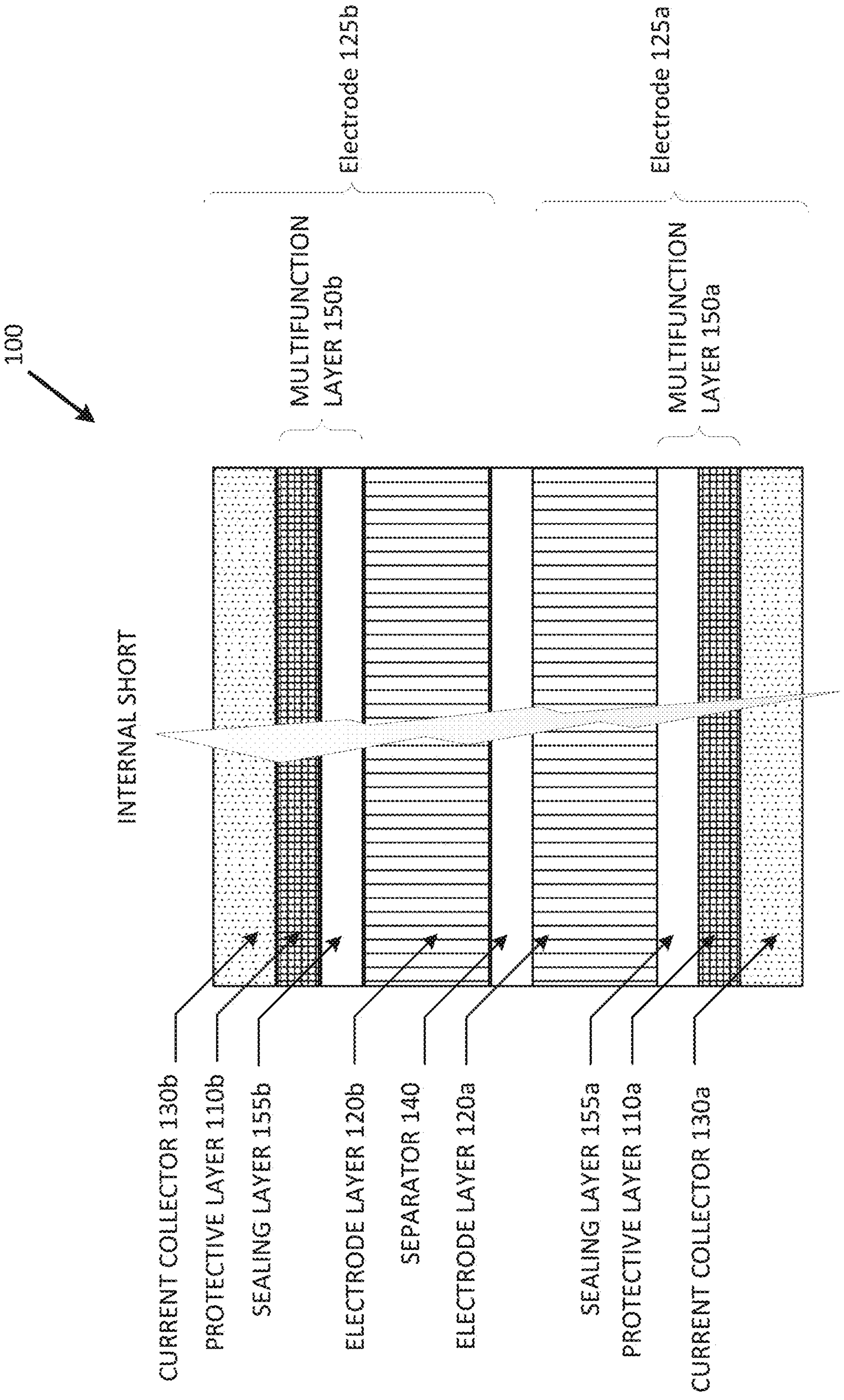
FIG. 2B depicts a schematic diagram illustrating another example of a battery cell having one or more multifunctional layers consistent with implementations of the current subject matter.

FIGS. 2A-B depict schematic diagrams illustrating examples of the battery cell 100 having one or more multifunction layers 150 consistent with implementations of the current subject matter. In some implementations of the current subject matter, each protective layer 110 of the battery cell 100 may be further coupled with a sealing layer 155 to form the one or more multifunction layers 150. For example, in FIG. 2A, a first multifunction layer 150*a*, which includes the first protective layer 110*a* and a first sealing layer 155*a*, may be interposed between the first electrode layer 120*a* and the first current collector 130*a*. In the example shown in FIG. 2A, the first protective layer 110*a* may be interposed between the first electrode layer 120*a* and the first sealing layer 155*a* while the first sealing layer 155*a* is further interposed between the first protective layer 110*a* and the first current collector 130*a*.

FIG. 2B depicts another example of the battery cell 100 including the first multifunction layer 150*a* interposed between the first electrode layer 120*a* and the first current collector 130*a* as well as a second multifunction layer 150*b* interposed between the second electrode layer 120*b* and the second current collector 130*b*. As shown in FIG. 2B, the second multifunction layer 150*b* may include a second protective layer 110*b* and a second sealing layer 155*b*, with the second protective layer 110*b* interposed between the second electrode layer 120*b* and the second sealing layer 155*b* while the second sealing layer 155*b* is further interposed between the second protective layer 110*b* and the second current collector 130*b*.

Figure 2C:
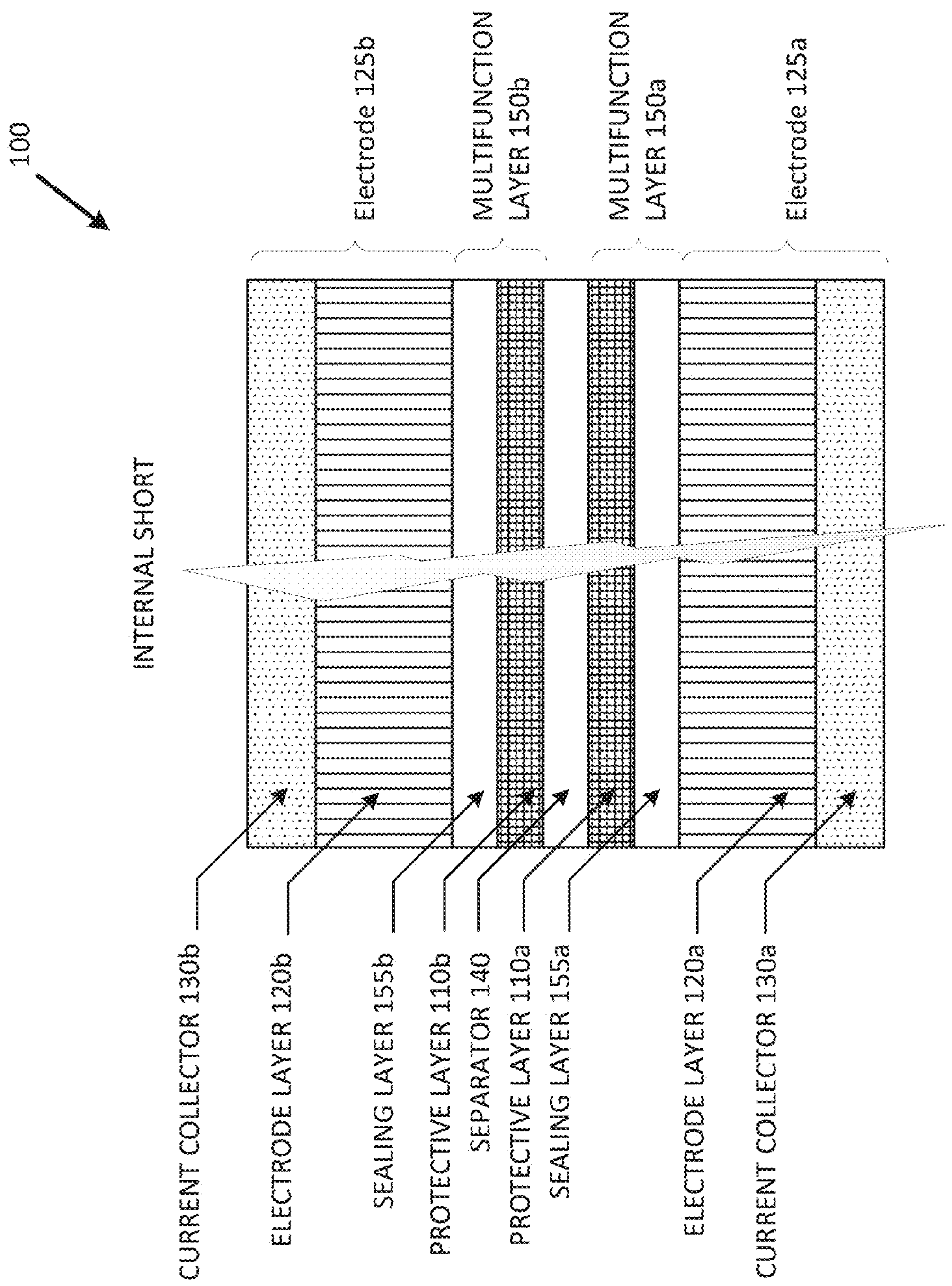
FIG. 2C depicts a schematic diagram illustrating another example of a battery cell having one or more multifunctional layers consistent with implementations of the current subject matter.

FIG. 2C depicts another example of the battery cell 100 in which the multifunction layers 150 are interposed between the separator 140 and the first electrode layer 120*a* and/or the second electrode layer 120*b*. For example, in some cases, the first multifunction layer 150*a* may be interposed between the separator 140 and the first electrode layer 120*a* with the first protective layer 110*a* being interposed between the separator 140 and the first sealing layer 155*a* while the first sealing layer 155*a* is further interposed between the first protective layer 110*a* and the first electrode layer 120*a*. Alternatively and/or additionally, the second multifunction layer 150*b* may be interposed between the separator 140 and the second electrode layer 120*b* with the second protective layer 110*b* being interposed between the separator 140 and the second sealing layer 155*b* while the second sealing layer 155*b* is further interposed between the second protective layer 110*b* and the second electrode layer 120*b*.

In some implementations of the current subject matter, the one or more protective layers 110 of the battery cell 100 may neutralize hazardous operating conditions such as overheating, overcharging, and/or internal short circuiting. For example, in some cases, the one or more protective layers 110 of the battery cell 100 may neutralize hazardous operating conditions by at least acting as a current limiter that reduces the flow of current through the battery cell 100 in the event of overheating, overcharging, and/or internal short circuiting. In some cases, the one or more protective layers 110 may reduce the flow of current through the battery cell 100 by at least exhibiting an increase in impedance when the temperature, voltage, and/or current through the battery cell 100 satisfies one or more threshold values, for example, by exceeding a temperature, a voltage, and/or a current associated with normal (or safe) operations. Alternatively and/or additionally, the one or more protective layers 110 of the battery cell 100 may neutralize hazardous operating conditions by at least acting as a current interrupter that eliminates the flow of current through the battery cell 100 in the event of overheating, overcharging, and/or internal short circuiting. For instance, in some cases, the one or more protective layers 110 may discontinue the flow of current through the battery cell 100 by at least creating a nonconductive gap when the temperature, voltage, and/or current through the battery cell 100 satisfies one or more threshold values, for example, by exceeding a temperature, a voltage, and/or a current associated with normal (or safe) operations.

In some implementations of the current subject matter, the one or more protective layers 110 of the battery cell 100 may be formulated to include one or more small molecule additives. The presence of the one or more small molecule additives in the composition of the one or more protective layers 110 may increase the stability and, in some cases, the conductivity of the one or more protective layers 110. As such, the inclusion of the one or more small molecule additives may improve the performance of the battery cell 100 including, for example, cell cycle (e.g., capacity retention), high temperature stability, and/or the like. For example, in some cases, the stability of the one or more protective layers 110 may be increased as a result of a reaction between the one or more small molecule additives and other compounds (e.g., polymers) present in the one or more protective layers 110. As noted, examples of small molecule additives include aromatic amines, aliphatic amines, aliphatic carboxylic acids, aromatic carboxylic acids, aliphatic hydroxy compounds, aromatic hydroxyl compounds, aliphatic thiol compounds, aromatic thiol compounds, epoxy substituted aliphatic or aromatic compounds, aromatic or aliphatic substituted pyrrole-2,5-dione, ethylene substituted aliphatic or aromatic compounds, free radical initiators, and/or the like. In some cases, the one or more protective layers 110 may include 0.1% to 90% of small molecule additives by weight, 1% to 50% of the small molecule additives by weight, 1% to 10% of the small molecule additives by weight, 1% to 5% of the small molecule additives by weight, and/or the like.

Figure 3A:
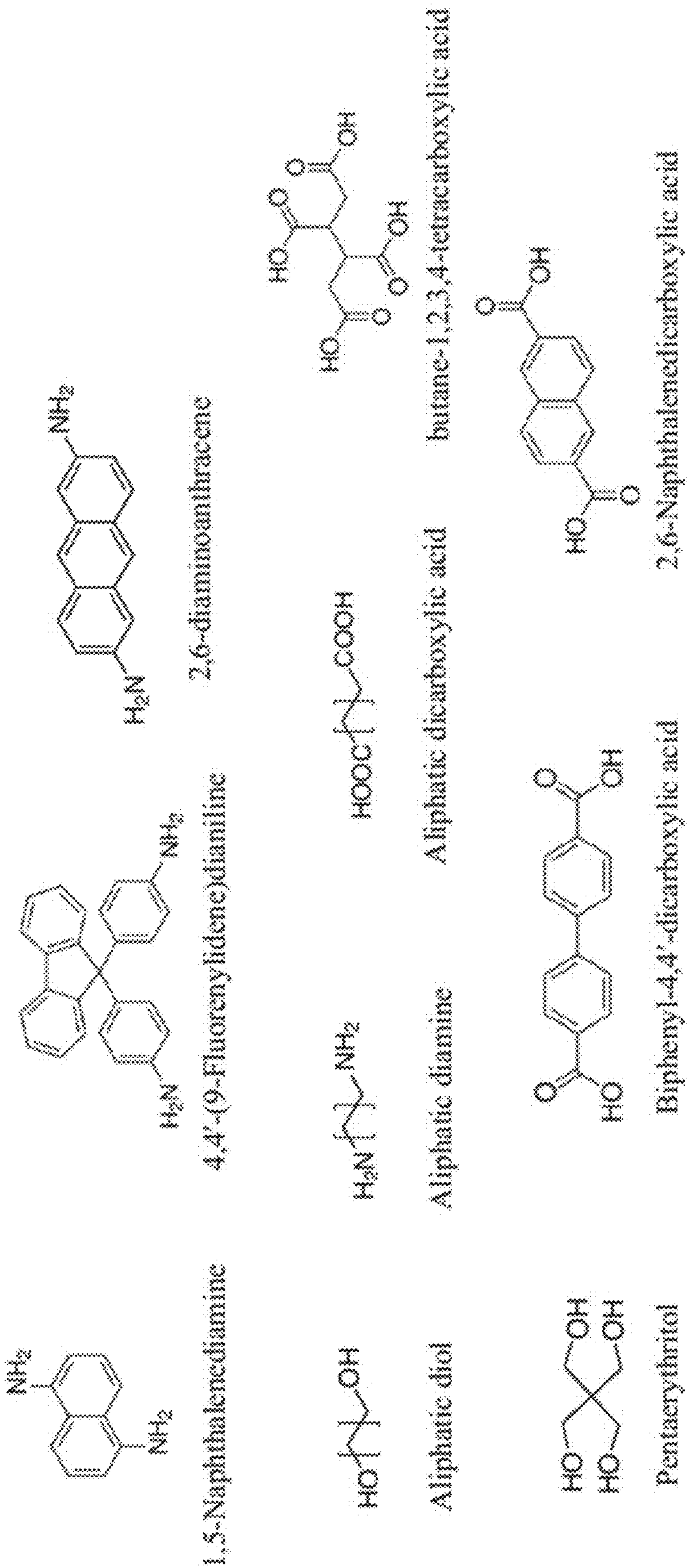
FIG. 3A depicts examples of small molecule additives consistent with implementations of the current subject matter.
Figure 3B:
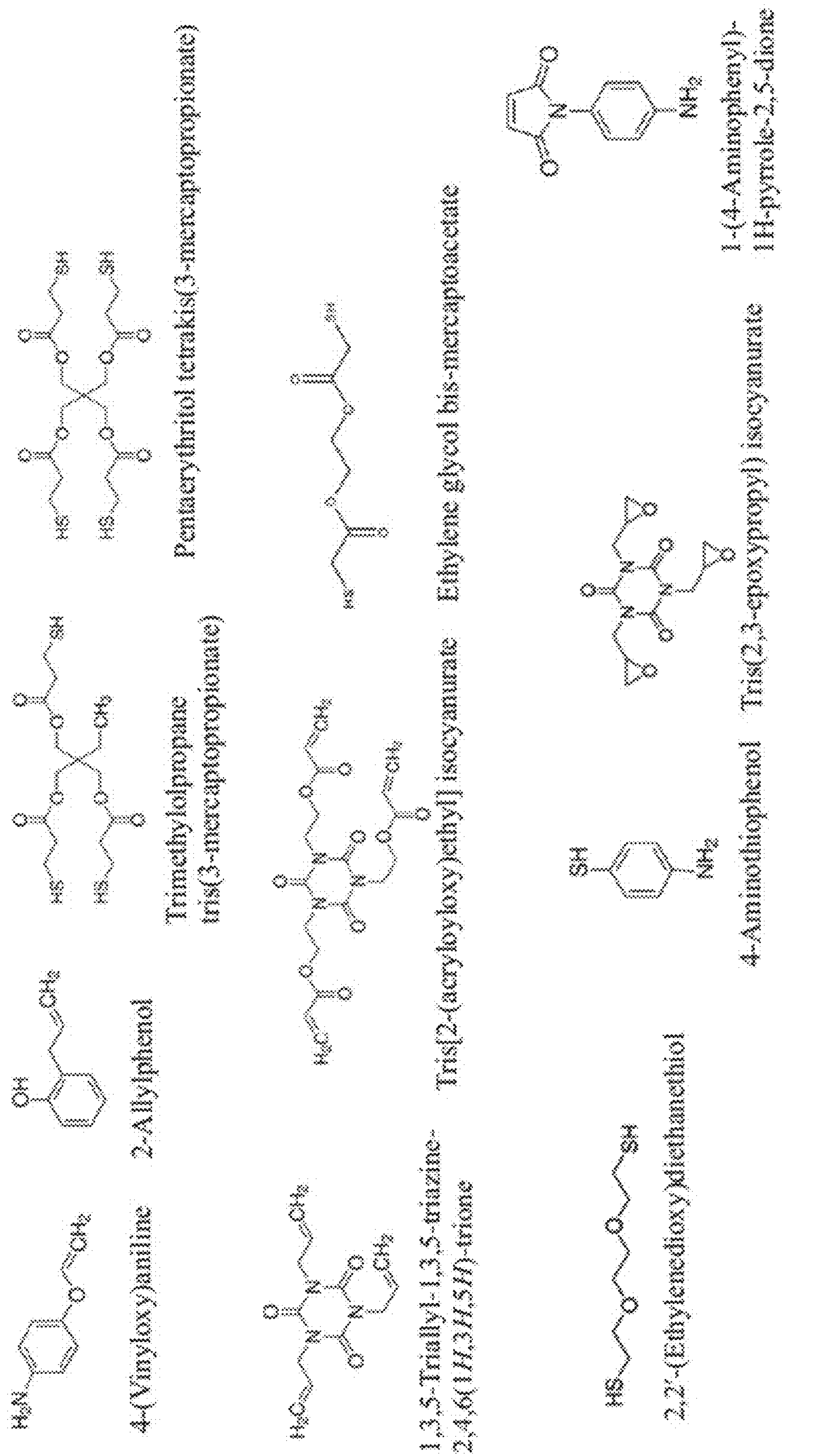
FIG. 3B depicts additional examples of small molecule additives consistent with implementations of the current subject matter.

FIGS. 3A-B depicts various examples of small molecule additives including 1,5-Naphthalenediamine, 4,4'-(9-Fluorenylidene)dianiline, 2,6-diaminoanthracene, aliphatic diol, aliphatic diamine, aliphatic dicarboxylic acid, butane-1,2,3,4,-tetracarboxylic acid, pentaerythritol, biphenyl-4,4'-dicarboxylic acid, 2,6-naphthalene dicarboxylic acid, 4-(vinyloxy)aniline, 2-allylphenol, trimethylolpropane tris(3-mercaptopropionate), petaerytheritol tetrakis(3-mercaptoproprionate), 1,3,5-triallyl-1,3,5-triazine-2,4,6(1H,3H,5H)-trione, tris[2-(acryloyloxy)ethyl] isocyanurate, ethylene glycol bi s-mercaptoacetate, 2,2'-(ethylenedioxy)diethanethiol, 4-aminothiophenol, tris(2,3-epoxypropyl) isocyanurate, and 1-(4-aminophenyl)-1H-pyrrole-2,5-dione.

Figure 3C:
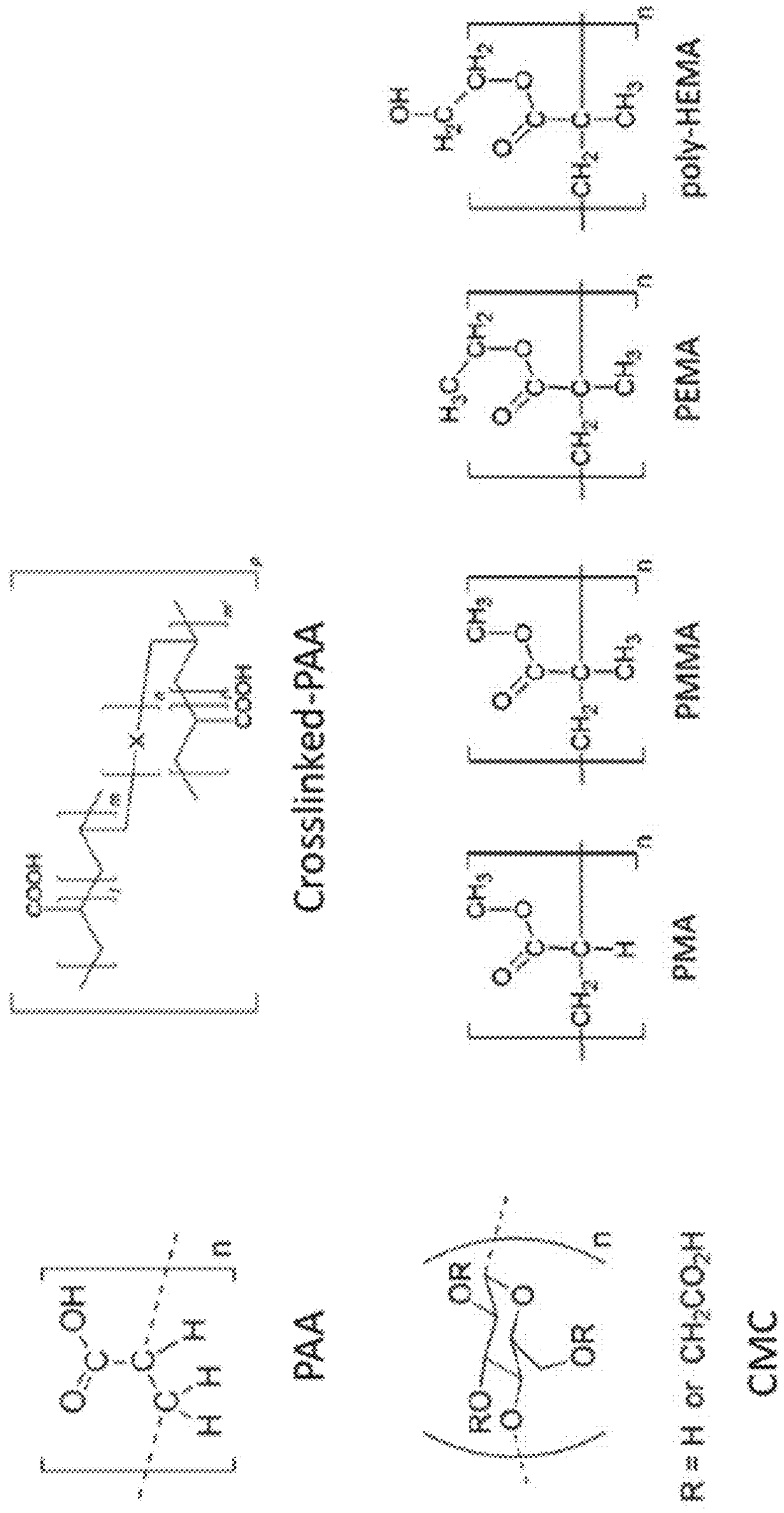
FIG. 3C depicts examples of functional polymers consistent with implementations of the current subject matter.

To form the one or more protective layers 110, the one or more small molecule additives may be combined with one or more active functional materials or inorganic materials along with one or more base materials (e.g., lithium hydroxide (LiOH), sodium hydroxide (NaOH), potassium hydroxide (KOH), and/or the like), binder materials, and/or conductive materials. For example, in some cases, the composition of the one or more protective layers may include one or more metal salts (e.g., organic salts and/or the like), ceramic nano materials, and conductive nano additives. In some cases, the composition of the one or more protective layers may include 1-90% small molecule additives relative to other compounds such as the one or more functional materials. As shown in FIG. 3C, examples of functional materials include polyacrylic acid (PAA), cross-linked polyacrylic acid (PAA), carboxymethyl cellulose (CMC), poly(methyl acrylate) (PMA), poly(methyl methacrylate) (PMMA), poly(ethyl methacrylate) (PEMA), poly (2-hydroxyethyl methacrylate) (pHEMA), and/or the like.

Examples of the one or more metal salts that may be present in the composition of the one or more protective layers 100 include polyacid salts [—$CR_2$—$(CR_2)_{0-100}$—COOM-]$_p$, polymethacrylic salts [—$CR_2$—$(CR_2)_{0-100}$—C$(CR_3)$(COOM-)-]$_p$, polyacrylate salts [—$CR_2$—$(CR_2)_{0-100}$—CR(COOM)-]$_p$, polymethylmethacrylic salts [—CR$(CR_3)$—$(CR_2)_{0-100}$—C$(CR_3)$(COOM)-]$_p$, polyols-M [—$CR_2$—$(CR_2)_{0-100}$—CR—OM-]$_p$, polysulfide-M [—$CR_2$—$(CR_2)_{0-100}$—CR—SM-]$_p$, and organic silicate [—$R_2$Si—O—$SiR_2$—]$_p$, wherein M is selected from a group of metals including lithium (Li), sodium (Na), potassium (K), calcium (Ca), cadmium (Cd), cobalt (Co), copper (Cu), iron (Fe), titanium (Ti), nickel (Ni), zinc (Zn), manganese (Mn), lead (Pb), strontium (Sr), and zinc (Zn), and wherein R is selected from H, —$CH_3$, —$CH_2CH_3$, and other organic substitutes. Where the one or more metal salts are present in the composition of the one or more protective layers 110, the one or more metal salts may form 1% to 99% of the one or more protective layers 110 by weight, 10% to 90% of the one or more protective layers 110 by weight, 20% to 70% of the one or more protective layers 110 by weight, and/or the like.

As noted, the composition of the one or more protective layers 110 may further include one or more ceramic nano materials. In some cases, the one or more ceramic nano materials that may be present in the composition of the one or more protective layers 110 may exhibit certain dimensions such as, for example, at least one dimension that is less than 500 nanometers, at least one dimension that is less than 100 nanometers, and/or the like. Examples of the one or more ceramic nano materials that may be present in the composition of the one or more protective layers 110 may include metal carbonates (e.g., $Li_2CO_3$, $Na_2CO_3$, $K_2CO_3$, $CaCO_3$, $BeCO_3$, $MgCO_3$, $SrCO_3$, $BaCO_3$, $FeCO_3$, and/or the like), metal hydrogen carbonates (e.g., $LiHCO_3$, $NaHCO_3$, $KHCO_3$, $CsHCO_3$, $Ca(HCO_3)_2$, $Mg(HCO_3)_2$, and/or the like), metal oxides (e.g., CaO, MgO, $SiO_2$, $Al_2O_3$, $TiO_2$, $ZrO_2$, CuO, $SnO_2$, $GeO_2$, $Co_3O_4$, ZnO, and/or the like), metal titanates (e.g., $Li_2TiO_3$, $CaTiO_3$, $MgTiO_3$, $BaTiO_3$, $ZnTiO_3$, and/or the like), and metal silicates (e.g., $Li_2SiO_3$, $Na_2SiO_3$, $MgSiO_3$, $CaSiO_3$, $FeSO_3$, $MnSiO_3$, $K_2SiO_3$, $Zn_2SiO_4$, $Mg_2SiO_4$, $Fe_2SiO_4$, $Mn_2SiO_4$, $ZrSiO_4$, $Be_2SiO_4$, and/or the like). Where the one or more ceramic nano materials are present in the composition of the one or more protective layers 110, the one or more ceramic nano materials may form 0.1% to 98.9% of the one or more protective layers 110 by weight, 5% to 80% of the one or more protective layers 110 by weight, and/or the like.

In some cases, the composition of the one or more protective layers 110 may include one or more conductive nano additives. For example, in cases where the one or more conductive nano additives are present in the composition of the one or more protective layers 110, the one or more conductive nano additives may form 0.1% to 20% of the one or more protective layers 110 by weight, 0.5% to 10% of the one or more protective layers 110 by weight, and/or the like. At least one dimension of the one or more conductive nano additives may satisfy a corresponding threshold. For instance, in some cases, at least one dimension of the one or more conductive nano additives may be less than 100 nanometers, less than 500 nanometers, and/or the like. Examples of the one or more conductive nano additives include carbon nano materials and carbon fibers (e.g., graphene, graphene oxide, carbon black, and/or the like), single-wall or multi-wall carbon nano tubes, metallic powders (e.g., copper (Cu), aluminum (Al), silver (Ag), gold (Au), titanium (Ti), nickel (Ni), manganese (Mg), and/or the like), or a combination of carbon powders and metallic powders.

Figure 3D:
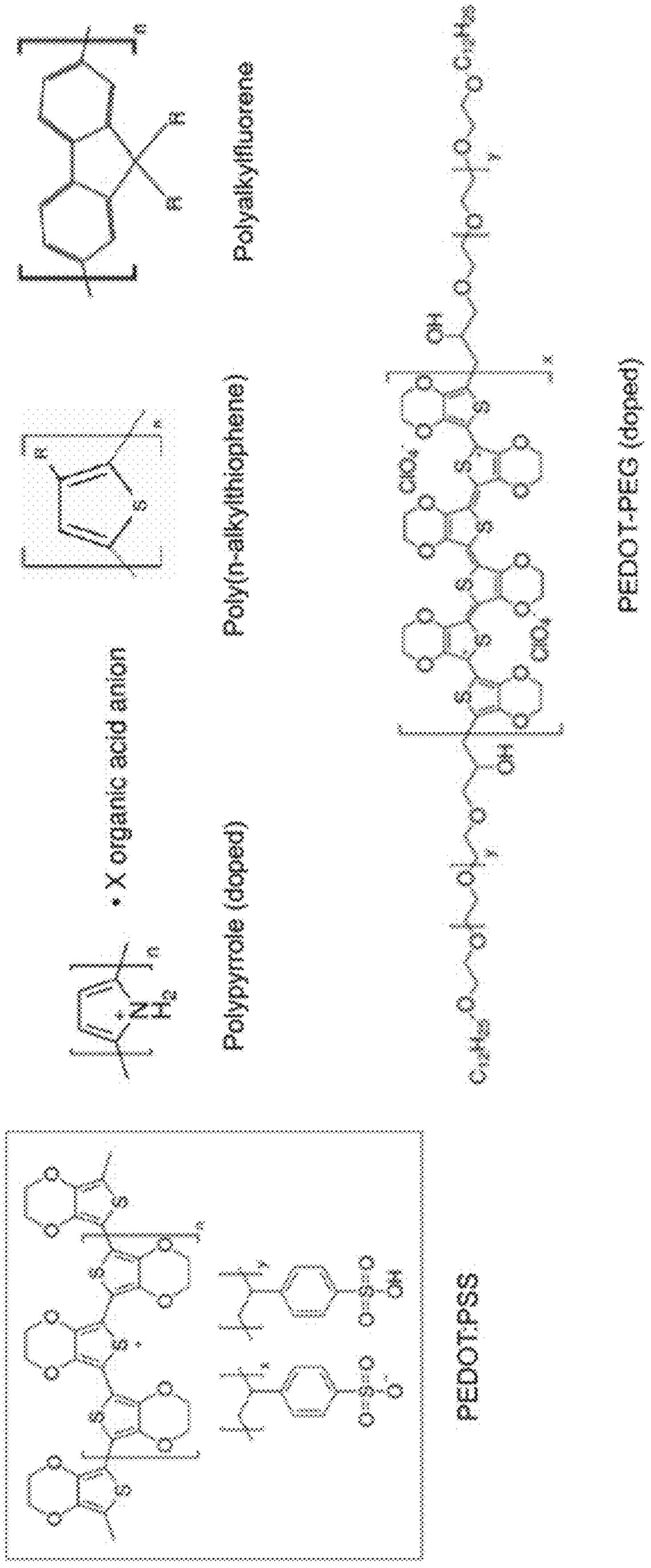
FIG. 3D depicts examples of functional conductive polymers consistent with implementations of the current subject matter.

In some cases, the composition of the one or more protective layers 110 may include one or more conductive polymers. The composition of the protective layer 110 may include 1-100% of the conductive polymer relative to the one or more conductive materials included therein or 1-100% of the conductive polymer relative to the binder materials included therein. Alternatively, in some cases, the conductive polymer may be the sole conductive material and active functional material present in the composition of the protective layer. For example, in some cases, the composition of the protective layer 110 may include 1% to 90% of the conductive polymers by weight, 1% to 50% of the conductive polymers by weight, 1% to 10% of the conductive polymers by weight, and/or the like. Examples of conductive polymers shown in FIG. 3D include poly(3,4-ethylenedioxythiophene) polystyrene sulfonate (PEDOT:PSS), polypyrrole (doped), poly(n-alkylthiophene), polyalylfluorene, poly(3,4-ethylenedioxythiophene)-co-poly(ethyleneglycol) (PEDOT-PEG) (doped), and/or the like.

In some implementations of the current subject matter, the protective layer 110 may be coupled with the sealing layer 155 to form the examples of the multifunction layers 150 shown in FIGS. 2A-C. The sealing layer 155 may be formed from one or more materials that are inert in the presence of the reactive components of the battery cell 100 such as the electrodes (e.g., the first electrode layer 110, the second electrode layer 210, and/or the like), the electrolyte, and/or the like. In some cases, the materials forming the protective layer 150 may be electrically conductive. Examples of the materials forming the protective layer 150 may include poly(ethylene-Co-vinyl acetate) (PECVA), styrene-butadiene rubber (SBR), Polytetrafluoroethylene (PTFE)), wax, silicon (Si) rubber, polyacrylic polymer, poly propylene, polyethylene, ethylene propylene diene monomer (EPDM) rubber and its analog, materials exhibiting a negative thermal expansion (NTE) coefficient (such as zinc cyanide ($ZnCN_2$) and so on), and materials that are reactive with the decomposition byproducts of electrolyte.

In instances where the sealing layer 155 is formed from a material having a negative thermal expansion (NTE) coefficient, the shrinkage of the protective layer 1' when the multifunctional safety layer 150 is exposed to higher temperatures (e.g., temperatures exceeding certain thresholds) may expose the protective layer 110 coupled with the sealing layer 155. Alternatively, in instances where the sealing layer 155 is formed from materials that are prone to decompose at higher temperatures and/or voltages (e.g., temperatures and/or voltages exceeding certain thresholds), the corresponding protective layer 110 may become exposed when the multifunctional safety layer 150 is subjected to higher temperatures and/or voltages. Once the protective layer 110 is exposed to the electrolyte, the electrode layers 120, or other reactive components of the battery cell 100, the reaction between them may neutralize hazardous operating conditions such as overheating, overcharging, and/or internal short circuiting. This reaction may include a physical reaction (e.g., a swelling or other expansion of the protective layer 110) that causes an interruption in the electronic conduction pathway within the battery cell 100. Alternatively and/or additionally, this reaction may include a chemical reaction such as a decomposition of the protective layer 110 and/or a reaction between the electrode layers 120 and the protective layer 110, which creates a nonconductive gap between the current collector 130 and the corresponding electrode layer 120. This reaction may also include a chemical reaction between the protective layer 110 and the electrolyte in the battery cell 100 that reduces the ionic conductivity of the electrolyte.

In some implementations of the current subject matter, the protective layer 110 and the sealing layer 155 may be activated by different triggers. For example, the sealing layer 155 may respond to a first trigger (e.g., a first temperature threshold, a first voltage threshold, a first current threshold, physical damage caused by metal penetration, crush and impact of the battery cell 100, and/or the like) that is different and/or more precise than the second trigger activating the protective layer 110. Accordingly, upon being activated by the first trigger, the sealing layer 155 may respond by at least exposing the protective layer 110. The protective layer 110 may either be activated by this exposure (e.g., to the electrode 120, the electrolyte, and/or other reactive components within the battery cell 100) and/or the second trigger (e.g., a second temperature threshold, a second voltage threshold, a second current threshold, physical damage, and/or the like).

Figure 4:
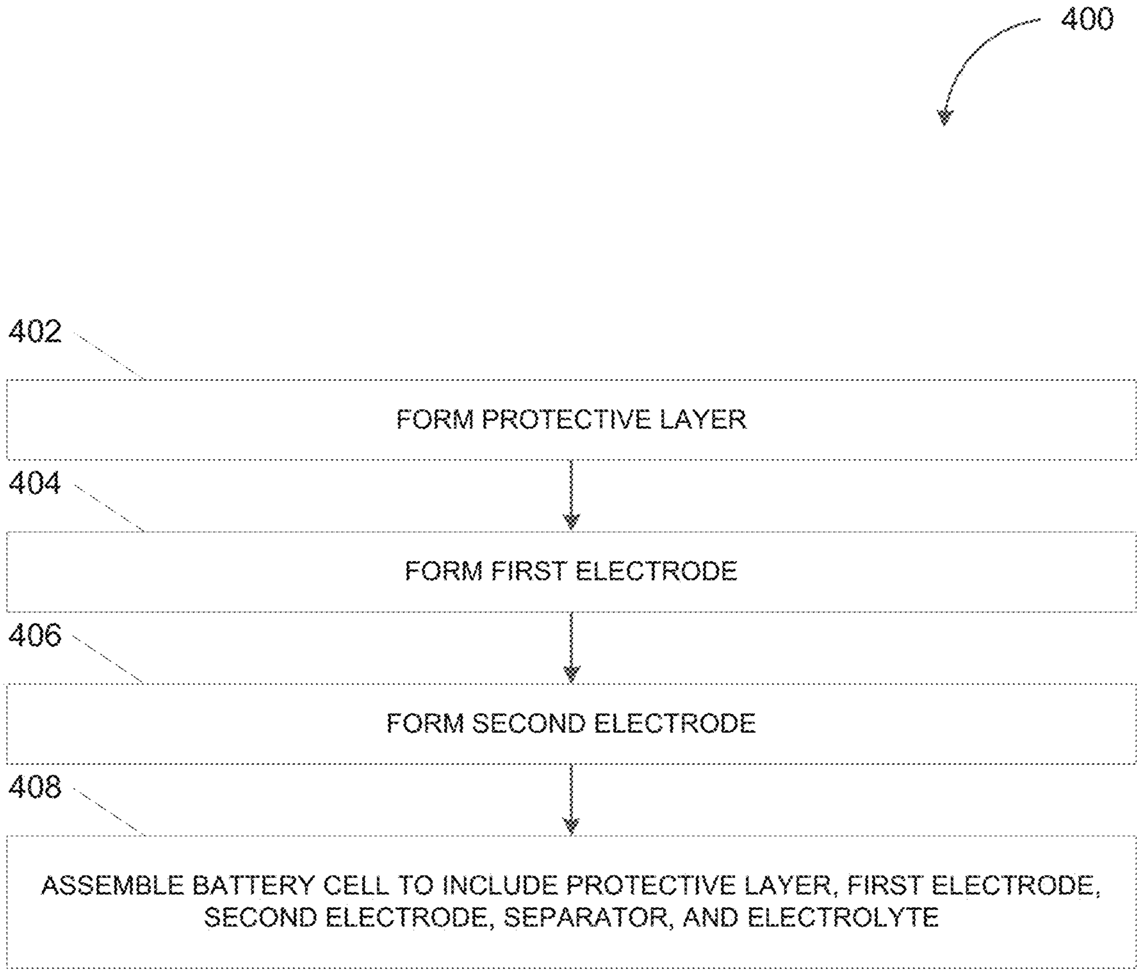
FIG. 4 depicts a flowchart illustrating a process for assembling a battery cell consistent with implementations of the current subject matter.

FIG. 4 depicts a flowchart illustrating an example of a process 400 for assembling a battery cell consistent with implementations of the current subject matter. Referring to FIG. 4, in some cases, the process 400 may be performed to assemble the battery cell 100 to include the one or more protective layers 110 or, in some cases, the one or more multifunction layers 150 including the protective layer 110 coupled with the sealing layer 155.

At 402, a protective layer may be formed. In some implementations of the current subject matter, the one or more protective layers 110 of the battery cell 100 may be formed from a composite material that includes one or more small molecule additives combined with one or more functional materials (e.g., polymers and/or the like), base materials (e.g., a metal hydroxide such as lithium hydroxide (LiOH), sodium hydroxide (NaOH), potassium hydroxide (KOH), and/or the like), binder materials, and/or conductive materials (e.g., carbon black, conductive polymer, and/or the like). For example, in some cases, the composite material forming the one or more protective layers 110 of the battery cell 100 may include one or more metal salts, ceramic nano materials, and conductive nano additives. Moreover, in some cases, the composite material forming the one or more protective layers 110 may be a slurry that is then coated on one or more of the electrode 120, the current collector 130, and the separator 140 of the battery cell 100. In some cases, the one or more protective layers 110 may be coupled with the one or more sealing layers 155 to form the one or more multifunction layers 150. In those cases, the composite material forming the one or more protective layers 110 may be a slurry that is coated on the surface of the one or more sealing layers 155 or the materials forming the one or more sealing layers 155 may be coated on the surface of the one or more protective layers 110 to form the one or more multifunction layers 150.

In some implementations of the current subject matter, subsequent to being coated, for example, on the surface of one or more of the electrode 120, the current collector 130, the separator 140, and/or the sealing layer 155, the slurry of the composite material forming the one or more protective layers 110 may be dried. In some cases, the slurry of the composite material forming the one or more protective layers 110 may undergo a high temperature treatment, for example, by being vacuum dried under high temperatures (e.g., between approximately 80° C. to 150° C.) for a long period of time (e.g., between approximately 8 hours to 24 hours). Subjecting the slurry of the composite material forming the one or more protective layers 110 to a high temperature treatment during formation may promote the reaction between the small molecule additives and the active functional polymers contained in the composite material. For example, the temperature and/or the duration of the high temperature treatment may be selected to ensure that all (or substantially all) of the small molecule additives react with the active functional polymers in order to eliminate the possibility of electrolyte contamination once the battery cell 100 is assembled.

At 404, a first electrode may be formed. For example, the first electrode **125*a* (e.g., the positive electrode) may be formed by coating the one or more materials (e.g., a slurry including the one or more materials) forming the first electrode layer 120*a* on the surface of the first current collector 130*a* before the one or more materials are dried, for example, at 140° C. for 10 hours. The first electrode 125*a* of the battery cell 100 may be further formed by punching the first electrode layer 120*a* into appropriately shaped and/or sized pieces. In some cases, the composite material forming the first protective layer 110*a* may be coated on the surface of the first electrode layer 120*a*. Moreover, in some cases, the material forming the first sealing layer 155*a* may be interposed between the composite material forming the first protective layer 110*a* and the material forming the first electrode layer 120*a***.

At 406, a second electrode may be formed. For example, the second electrode **125*b* (e.g., the negative electrode) may be formed by coating the one or more materials (e.g., a slurry including the one or more materials) forming the second electrode layer 120*b* on the surface of the second current collector 130*b* before drying the one or more materials are dried, for example, at 125° C. for 10 hours. The second electrode 125*b* of the battery cell 200 may be further formed by punching the second electrode layer 120*b* into appropriately shaped and/or sized pieces. In some cases, the composite material forming the second protective layer 110*b* may be coated on the surface of the second electrode layer 120*b*. Moreover, in some cases, the material forming the second sealing layer 155*b* may be interposed between the composite material forming the second protective layer 110*b* and the material forming the second electrode layer 120*b***.

At 408, a battery cell may be assembled to include the protective layer, the first electrode, the second electrode, a separator, and an electrolyte. For example, the battery cell 100 may be formed to include the one or more protective layer 110, the first electrode **125*a* including the first electrode layer 120*a* and the first current collector 130*a*, the second electrode 125*b* including the second electrode layer 120*b* and the second current collector 130*b*, the separator 140, and an electrolyte. In instances where the battery cell 100 is a cylindrical cell, a layer of the separator 140 may be interposed between the first electrode 125*a* and the second electrode 125*b* of the battery cell 100 to form a sheet that is then wound, for example, around mandrel, to form a jellyroll before the jellyroll deposited inside a case. In instances where the battery cell 100 is a pouch cell, the first electrode 125*a* and the second electrode 125*b* may be stacked with a layer of the separator 140 interposed therebetween. One or more such stacks may then be deposited inside a pouch. The battery cell 100 may be filled with the electrolyte before being sealed, aged (e.g., room temperature for 24 hours), and subjected to one or more charging and discharging cycles (e.g., at a C/20 charging rate). In some cases, in addition to and/or instead of the aforementioned high temperature treatment, the one or more protective layers 110 may also undergo radiation treatment (e.g., gamma ray such as X-ray, beta ray, ultraviolet (UV) light, and/or the like) as part of the formation process, which may further promote the cross-linking of the polymers contained in the composite material forming the one or more protective layers 110**.

Figure 5A:
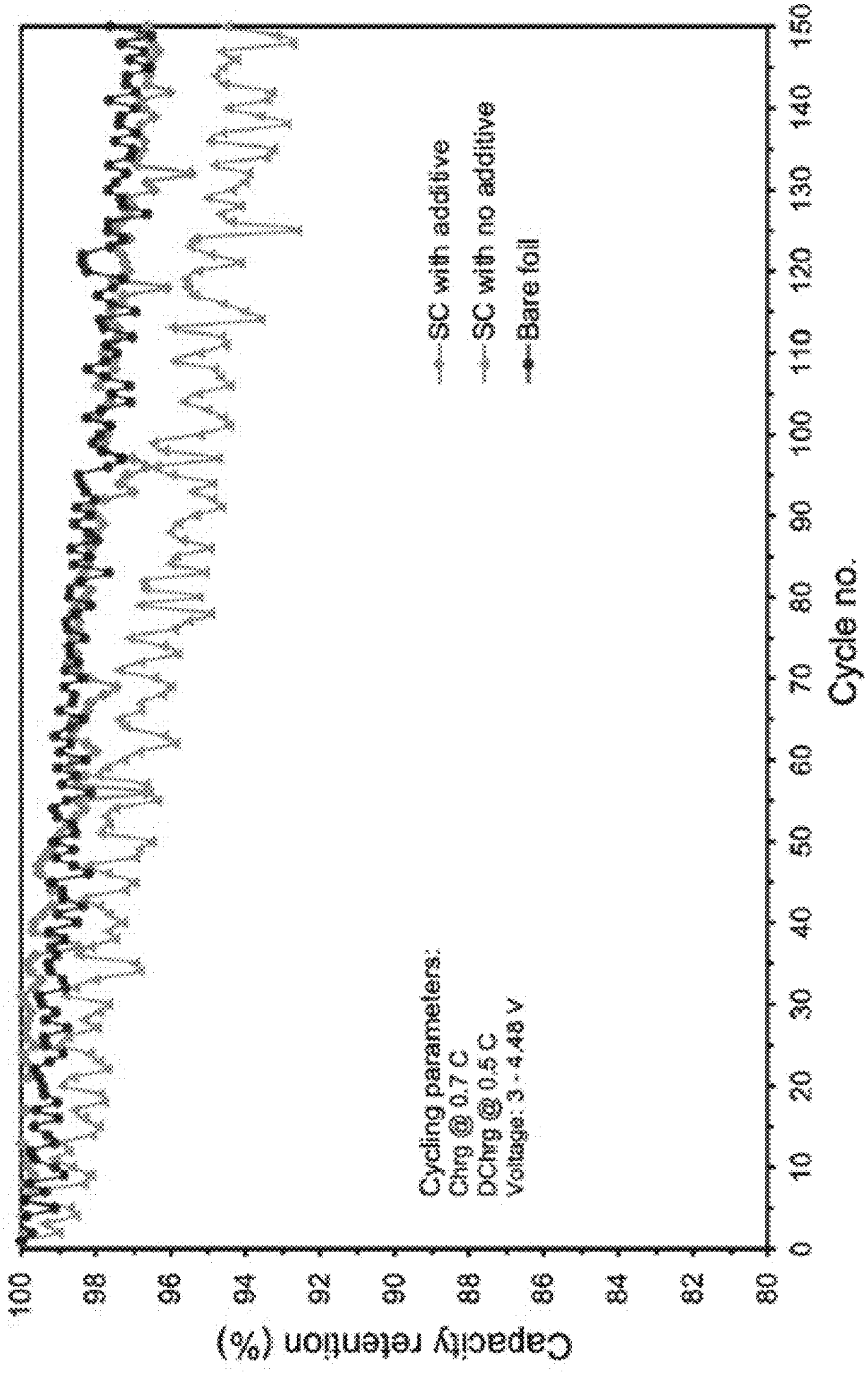
FIG. 5A depicts a graph illustrating the results of a cycling test performed on a first battery cell including a protective layer having an additive, a second battery cell including a protective layer without any additives, and a third battery cell without a protective layer consistent with implementations of the current subject matter.

As noted, the inclusion of the one or more protective layers 110 may improve the safety profile of the battery cell 100 including when the battery cell 100. For example, the one or more protective layers 110 may act as a current limiter and/or a current interrupter to neutralize hazardous operating conditions at the battery cell 100 including, for example, overheating, overcharging, internal short circuiting, and/or the like. The performance of the battery cell 100, including cell cycle (e.g., capacity retention), high temperature stability, and/or the like, may be further improved by forming the one or more protective layers 110 are formed from a composite material that includes one or more small molecule additives. To further illustrate, FIG. 5A depicts a graph comparing the cycle performance of a first battery cell including a protective layer having an additive, a second battery cell including a protective layer without any additives, and a third battery cell without any protective layers. The first battery cell, the second battery cell, and the third battery cell were each subjected to a cycling test that includes charging at 0.7 coulombs to a voltage of 4.48 volts and discharging at 0.5 coulombs to a voltage of 3 volts. The cycling performance of each battery cell may be evaluated based on the capacity retention of each battery cell after the batter cells undergo up to 150 charging and discharging cycles. As shown in FIG. 5A, the first battery cell including the protective layer having the additive exhibited better cycling performance (e.g., a higher percentage of capacity retention over successive charging and discharging cycles) than the second battery cell whose protective layer does not include any additives. Moreover, the comparison in FIG. 5A shows that the inclusion of the additives in the protective layer of the first battery cell further renders the cycling performance of the first battery cell comparable to that exhibited by the third battery cell, which does not include any protective layers and is therefore more susceptible to hazardous operating conditions than the first battery cell. In other words, the presence of one or more additives, such as the small molecule additives described herein, may minimize the impact that the inclusion of one or more protective layers may have on the cycling performance of a battery cell while still retaining the safety benefits derived therefrom.

Figure 5B:
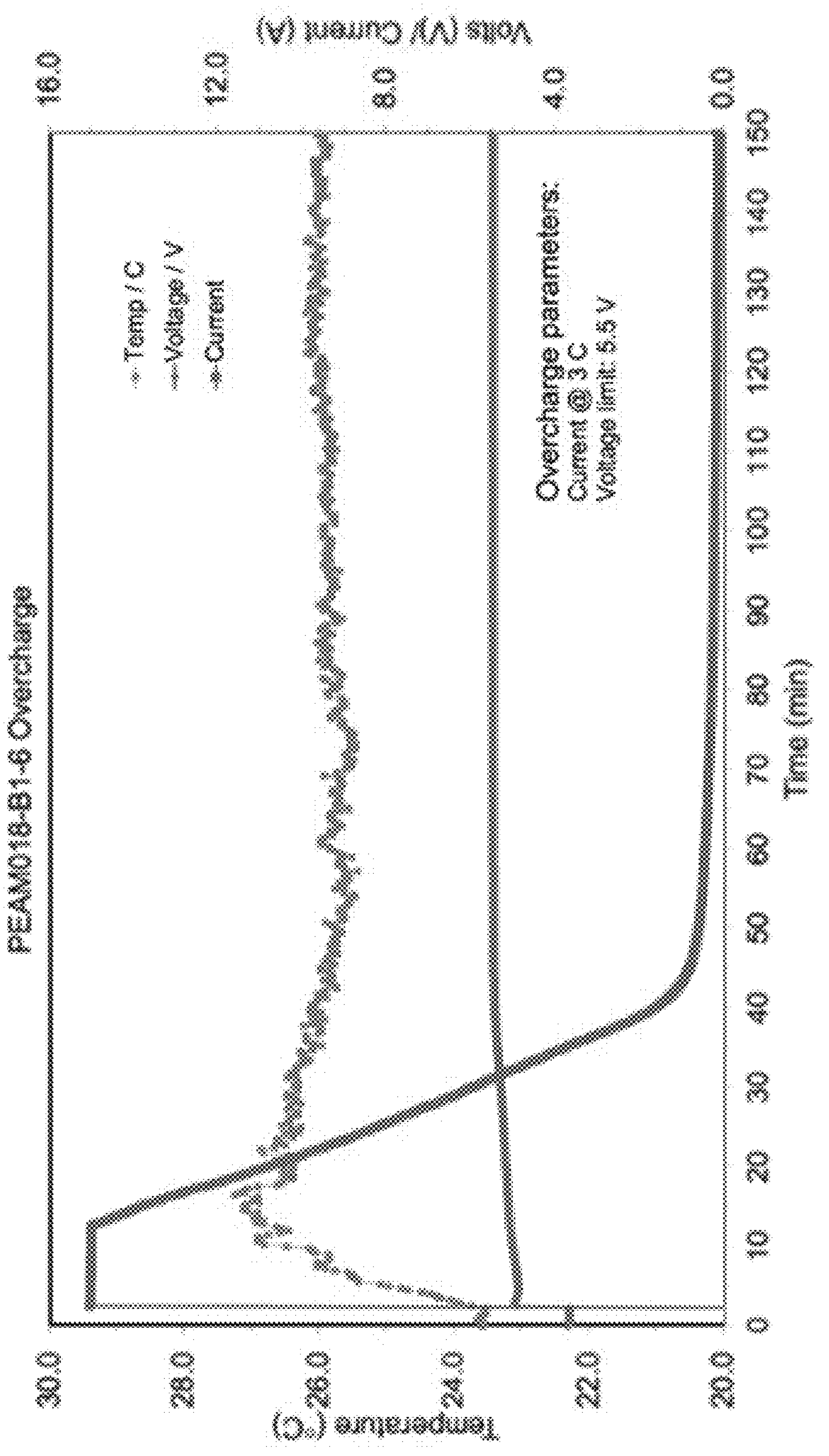
FIG. 5B depicts a graph illustrating the results of an overcharge test performed on a first battery cell including a protective layer having an additive consistent with implementations of the current subject matter.
Figure 5C:
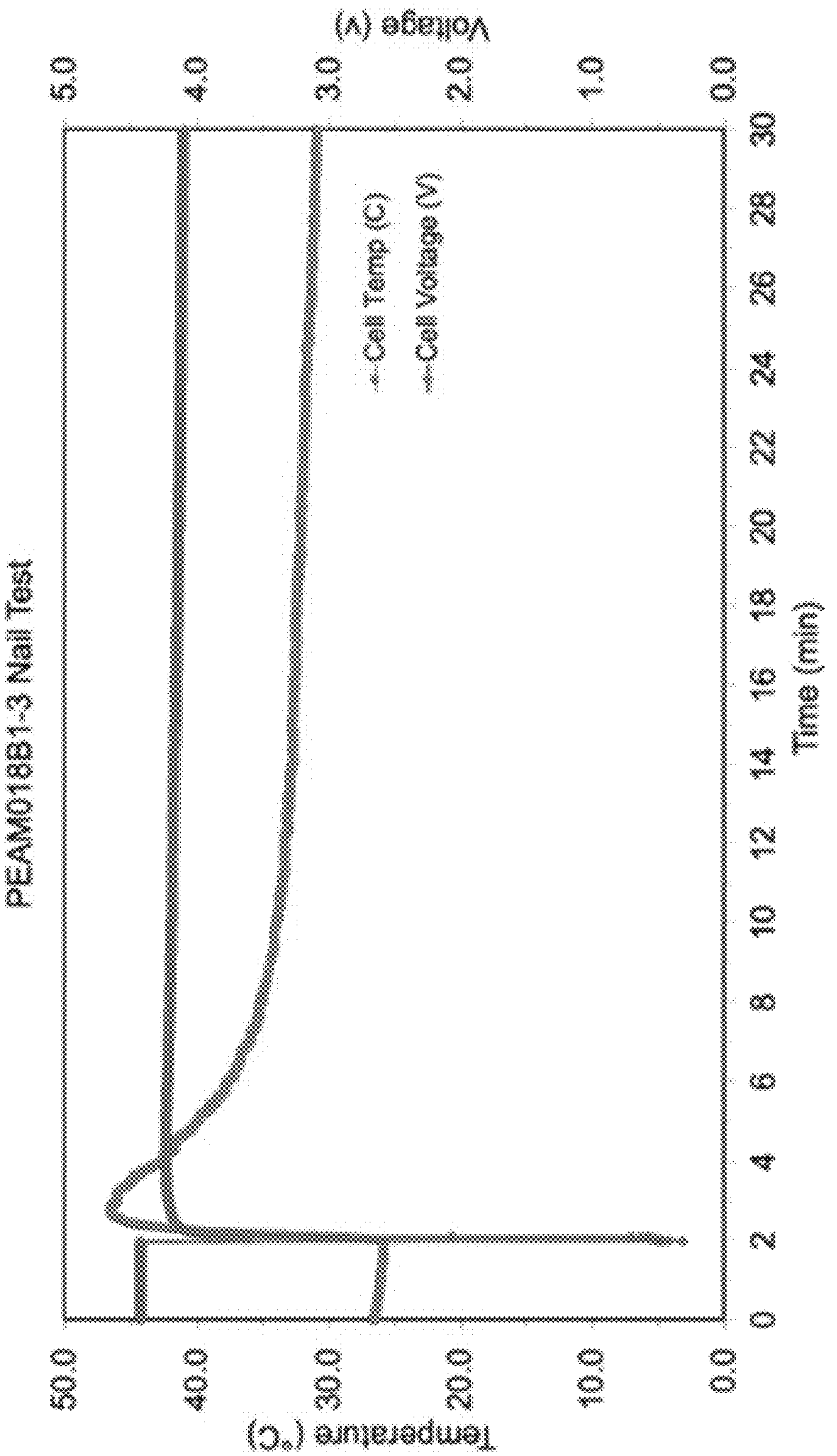
FIG. 5C depicts a graph illustrating the results of a puncture test performed on a first battery cell including a protective layer having an additive consistent with implementations of the current subject matter.

FIGS. 5B-C depict graphs illustrating the safety profiles a battery cell that includes one or more protective layers formulated to include one or more additives, such as the small molecule additives described herein. In FIG. 5B, for example, the battery cell may be overcharged but the one or more protective layers may reduce and/or disrupt the flow of current, such that the temperature and voltage of the battery cell remains stable and the battery cell does not overheat and undergo a thermal runaway. FIG. 5C depicts the changes in the temperature and voltage of the battery cell after the battery cell undergoes physical damages such as penetration, deformation, impact, and/or the like. As shown in FIG. 5C, the presence of the one or more protective layers prevents the physical damage to the battery cell from triggering any significant spikes in the temperature and voltage of the battery cell. Instead, the temperature and voltage of the battery cell remain stable, indicating that the presence of the one or more protective layers also prevents physical damages to the battery cell from causing overheating and a thermal runaway at the battery cell.

Example I

In some implementations of the current subject matter, the one or more protective layers 110 may be formed from a composite material including carbopol, lithium hydroxide (LiOH), super P, 4,4'-(9-fluorenylidene)dianiline, and water.

In some implementations of the current subject matter, the one or more protective layers may be formed from a composite material including carbopol (68.53%), lithium hydroxide (LiOH) (24.47%), super P (5%), 4,4'-(9-fluorenylidene)dianiline (2%), and water.

Example II

In some implementations of the current subject matter, the one or more protective layers 110 may be formed from a composite material including carbopol, lithium hydroxide (LiOH), super P, biphenyl-4,4'-dicarboxylic acid, and water.

In some implementations of the current subject matter, the one or more protective layers 110 may be formed from a composite material including carbopol (67.79%), lithium hydroxide (LiOH) (24.21%), super P (5%), biphenyl-4,4'-dicarboxylic acid (3%), and water.

Example III

In some implementations of the current subject matter, the one or more protective layers 110 may be formed from a composite material including carbopol, lithium hydroxide (LiOH), super P, petaerytheritol tetrakis(3-mercaptopropri-onate), tris[2-(acryloyloxy)ethyl] isocyanurate, and water.

In some implementations of the current subject matter, the one or more protective layers 110 may be formed from a composite material including carbopol (68.53%), lithium hydroxide (LiOH) (24.47%), super P (5%), petaerytheritol tetrakis(3-mercaptoproprionate) (1%), tris[2-(acryloyloxy)ethyl] isocyanurate (1%), and water.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A battery cell, comprising:

an electrolyte;

a first electrode including a first electrode layer and a first current collector;

a second electrode including a second electrode layer and a second current collector;

a separator interposed between the first electrode and the second electrode; and a first protective layer reducing or interrupting a current flow within the battery cell upon activation, wherein the first protective layer is formed from a composition that includes one or more small molecule additives combined with a functional material and/or a conductive material, and wherein the composition of the first protective layer includes (i) carbopol, lithium hydroxide (LiOH), super P, 4,4'-(9-fluorenylidene)dianiline, and water, (ii) carbopol, lithium hydroxide (LiOH), super P, biphenyl-4,4'-dicarboxylic acid, and water, or (iii) carbopol, lithium hydroxide (LiOH), super P, petaerytheritol tetrakis(3-mercaptoproprionate), tris[2-(acryloyloxy)ethyl] isocyanurate, and water.

2. The battery cell of claim 1, wherein the one or more small molecule additives include an aromatic amine, an aliphatic amine, an aliphatic carboxylic acid, an aromatic carboxylic acid, an aliphatic hydroxy compound, an aromatic hydroxyl compound, an aliphatic thiol compound, an aromatic thiol compound, an epoxy substituted aliphatic or aromatic compound, aromatic or aliphatic substituted pyrrole-2,5-dione, an ethylene substituted aliphatic or aromatic compound, and/or a free radical initiator.

3. The battery cell of claim 1, wherein the composition of the first protective layer includes 0.1% to 90% of the one or more small molecule additive by weight.

4. The battery cell of claim 1, wherein the functional material includes polyacrylic acid (PAA), crosslinked polyacrylic acid (PAA), carboxymethyl cellulose (CMC), poly (methyl acrylate) (PMA), poly(methyl methacrylate) (PMMA), poly(ethyl methacrylate) (PEMA), and/or poly(2-hydroxyethyl methacrylate) (pHEMA).

5. The battery cell of claim 1, wherein the conductive material is carbon black or a conductive polymer selected from poly(3,4-ethylenedioxythiophene) polystyrene sulfonate (PEDOT:PSS), polypyrrole (doped), poly(n-alkylthiophene), polyalylfluorene, and poly(3,4-ethylenedioxythiophene)-co-poly(ethyleneglycol) (PEDOT-PEG) (doped).

6. The battery cell of claim 1, wherein the composition of the first protective layer further includes one or more base materials and/or binder materials.

7. The battery cell of claim 1, wherein the first protective layer is interposed between (i) the first electrode layer and the first current collector or (ii) the separator and the first electrode layer.

8. The battery cell of claim 1, wherein the first protective layer is coupled with a sealing layer that prevents a reaction between the first protective layer and at least one of the first electrode layer and the electrolyte of the battery cell until the sealing layer is activated by a second trigger.

9. The battery cell of claim 1, further comprising:

a second protective layer formed from the composition that includes the one or more small molecule additives combined with the functional material and/or the conductive material, the second protective layer being interposed between (i) the second electrode layer and the second current collector or (ii) the separator and the second electrode layer.

10. The battery cell of claim 9, wherein the second protective layer is coupled with a sealing layer that prevents a reaction between the second protective layer and at least one of the second electrode layer and the electrolyte of the battery cell until the sealing layer is activated by at least one of a temperature trigger, a voltage trigger, a current trigger, and a physical damage to the battery cell.

11. The battery cell of claim 1, wherein the first protective layer is activated by at least one of a temperature trigger, a voltage trigger, a current trigger, and a physical damage to the battery cell.

12. The battery cell of claim 1, wherein the composition of the first protective layer includes (i) 68.53% carbopol, 24.47% lithium hydroxide (LiOH), 5% super P, 2% 4,4'-(9-fluorenylidene)dianiline, and water, (ii) 67.79% carbopol, 24.21% lithium hydroxide (LiOH), 5% super P, 3% biphenyl-4,4'-dicarboxylic acid, and water, or (iii) 68.53% carbopol, 24.47% lithium hydroxide (LiOH), 5% super P, 1% petaerytheritol tetrakis(3-mercaptoproprionate), 1% tris[2-(acryloyloxy)ethyl] isocyanurate, and water.

* * * * *